US007455122B2

(12) United States Patent
Chen

(10) Patent No.: US 7,455,122 B2
(45) Date of Patent: Nov. 25, 2008

(54) PNEUMATIC HAND TOOL

(75) Inventor: Chi-Chen Chen, Taiping (TW)

(73) Assignee: Year Congratulate Industrial Co., Ltd, Taichung Hsien (TW)

( * ) Notice: Subject to any disclaimer, the term of this patent is extended or adjusted under 35 U.S.C. 154(b) by 172 days.

(21) Appl. No.: 11/524,940

(22) Filed: Sep. 22, 2006

(65) Prior Publication Data

US 2008/0093096 A1 Apr. 24, 2008

(51) Int. Cl.
*B23B 45/04* (2006.01)

(52) U.S. Cl. ........................ 173/104; 173/218; 173/107

(58) Field of Classification Search ................. 173/218, 173/104, 107, 168

See application file for complete search history.

(56) References Cited

U.S. PATENT DOCUMENTS

| | | | | |
|---|---|---|---|---|
| 4,995,296 | A * | 2/1991 | Chen | 81/57.44 |
| 5,040,618 | A * | 8/1991 | Morrison et al. | 173/104 |
| 6,044,917 | A * | 4/2000 | Brunhoelzl | 173/93.5 |
| 6,047,780 | A * | 4/2000 | Lin | 173/168 |
| 6,059,049 | A * | 5/2000 | Lin | 173/93.5 |
| 6,397,954 | B1 * | 6/2002 | Liu | 173/93.5 |
| 6,935,437 | B2 * | 8/2005 | Izumisawa | 173/93 |
| 7,040,414 | B1 * | 5/2006 | Kuo | 173/179 |
| 7,174,971 | B1 * | 2/2007 | Chen | 173/104 |
| 7,225,959 | B2 * | 6/2007 | Patton et al. | 227/2 |
| 2003/0010513 | A1 * | 1/2003 | Taga | 173/168 |
| 2003/0230423 | A1 * | 12/2003 | Izumisawa | 173/107 |
| 2006/0225903 | A1 * | 10/2006 | Sterling et al. | 173/104 |

* cited by examiner

*Primary Examiner*—Brian D Nash
(74) *Attorney, Agent, or Firm*—Ming Chow; Sinorica, LLC

(57) ABSTRACT

A compact pneumatic hand tool composed of a body, a cylinder assembly, a sealing pad, a striking assembly, a front cap, a control knob, a ventilation cap and threaded bolts. A first bearing is mounted around a rear end of the striking assembly and an outer rim of the first bearing is securely received in a central hole of the cylinder assembly. A second bearing is mounted on a central shaft of the rotor in the cylinder assembly. The control knob is mounted on the cylinder assembly. A front end of the central shaft of the striking assembly extends out of a front cap and the body is connected to the front cap via threaded bolts so that the striking assembly and the cylinder assembly are sealingly enclosed between the front cap and the body to accomplish the compact and light-weight requirements.

3 Claims, 9 Drawing Sheets

PNEUMATIC HAND TOOL

BACKGROUND OF THE INVENTION

1. Field of the Invention

The present invention relates to a pneumatic hand tool, and more particularly to a pneumatic hand tool which is compact is size and low cost.

2. Description of the Prior Art

The current available pneumatic hand tool is shown in FIG. 9, which includes a body (90), a cylinder (91), a rotor (92), a bearing (93), a sealing cap (94) and a control knob (95). The conventional pneumatic hand tool as shown is characterized in that the sealing cap (94) is firmly secured to a rear side of the body (90) so as to sealingly encase and position the cylinder (91), the rotor (92) and the bearing (93) inside the body (90). The sealing cap (94) is provided with an inlet passage and a pair of mutually corresponding air conducting passages incorporative with the control knob (95) to control and adjust the air path and air volume entering the cylinder (91). Accordingly, the rotation direction and rotational torque of the pneumatic hand tool is controlled.

Although this structural arrangement does satisfy the designed goals, the separation of the control knob (95) and the cylinder (91) limits that the body (90) has to be made of a metal material and the airtight capability has to be enhanced so as to accomplish safety requirements. Enhancing safety abilities of this conventional pneumatic hand tool increases the manufacture cost. Also, the metal material limitation for the production of the body (90) results in that the overall weight of the pneumatic hand tool is heavy. As a result of heavy weight of the hand tool, it is not easy for the user to operate the hand tool.

To overcome the shortcomings, the present invention tends to provide a novel pneumatic hand tool to mitigate the aforementioned problems.

SUMMARY OF THE INVENTION

The primary objective of the present invention is to provide a compact pneumatic hand tool composed of a body, a cylinder assembly, a sealing pad, a striking assembly, a front cap, a control knob, an exhaust cap and threaded bolts. A first bearing is mounted around a rear end of a central axle of the striking assembly and an outer rim of the first bearing is securely received in a central hole of a front cover of the cylinder assembly. A second bearing is mounted on a second shaft of the rotor in the cylinder assembly. The control knob is mounted on the cylinder assembly. A front end of the central shaft of the striking assembly extends out of a front cap and the body is connected to the front cap via threaded bolts so that the striking assembly and the cylinder assembly are sealingly enclosed between the front cap and the body to accomplish the compact and light-weight requirements.

Other objects, advantages and novel features of the invention will become more apparent from the following detailed description when taken in conjunction with the accompanying drawings.

DETAILED DESCRIPTION OF THE PREFERRED EMBODIMENT

Figure 1:
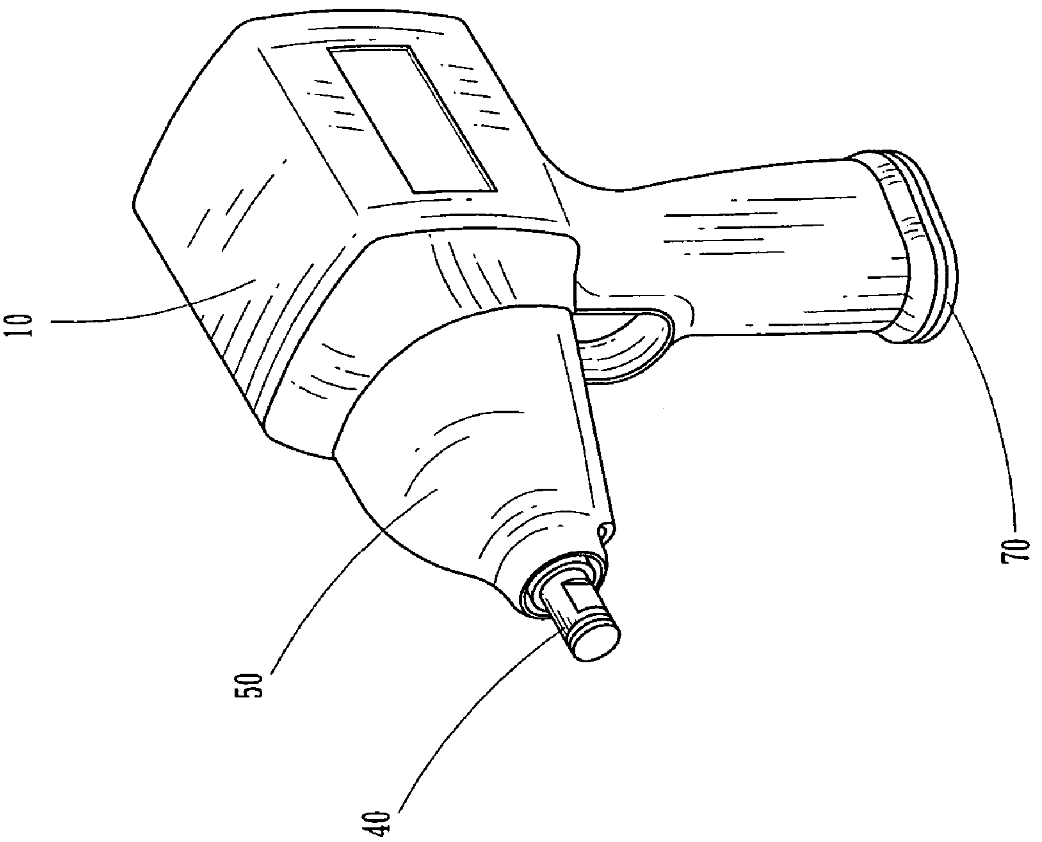
FIG. 1 is a perspective view of the pneumatic hand tool of the present invention.
Figure 2:
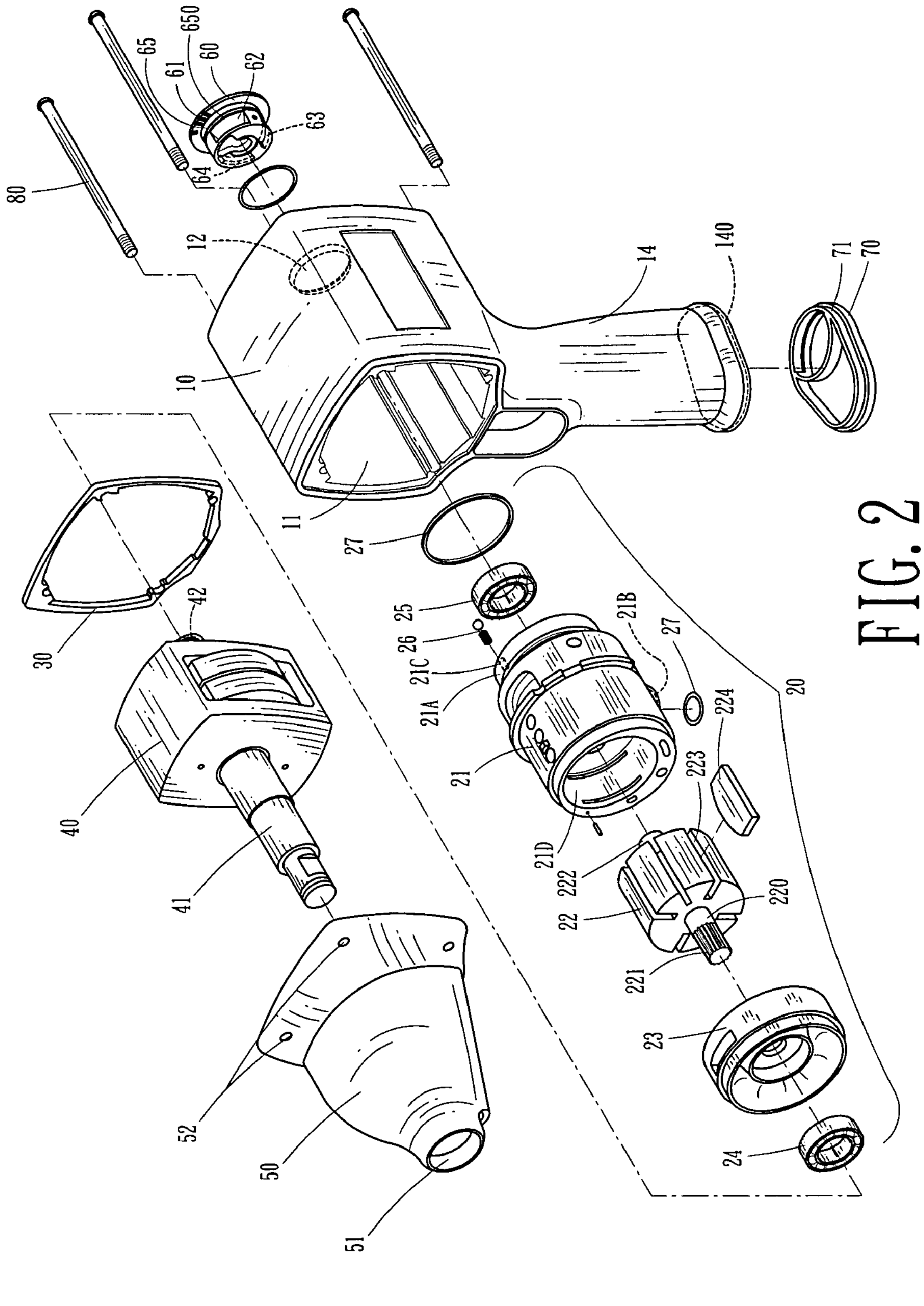
FIG. 2 is an exploded perspective view of the pneumatic hand tool of the present invention.
Figure 3:
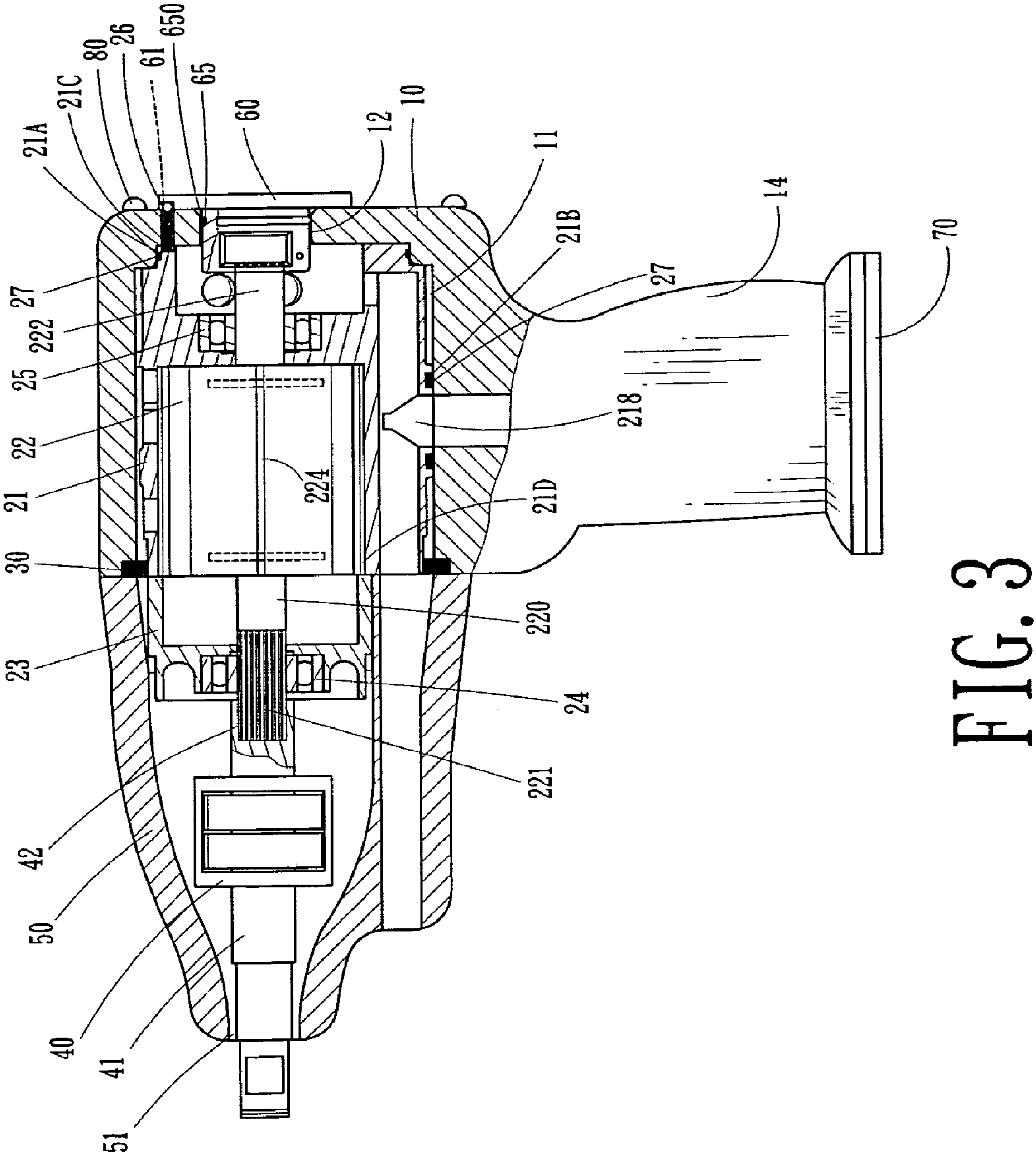
FIG. 3 is a partially cross sectional view of the pneumatic hand tool of the present invention.
Figure 4:
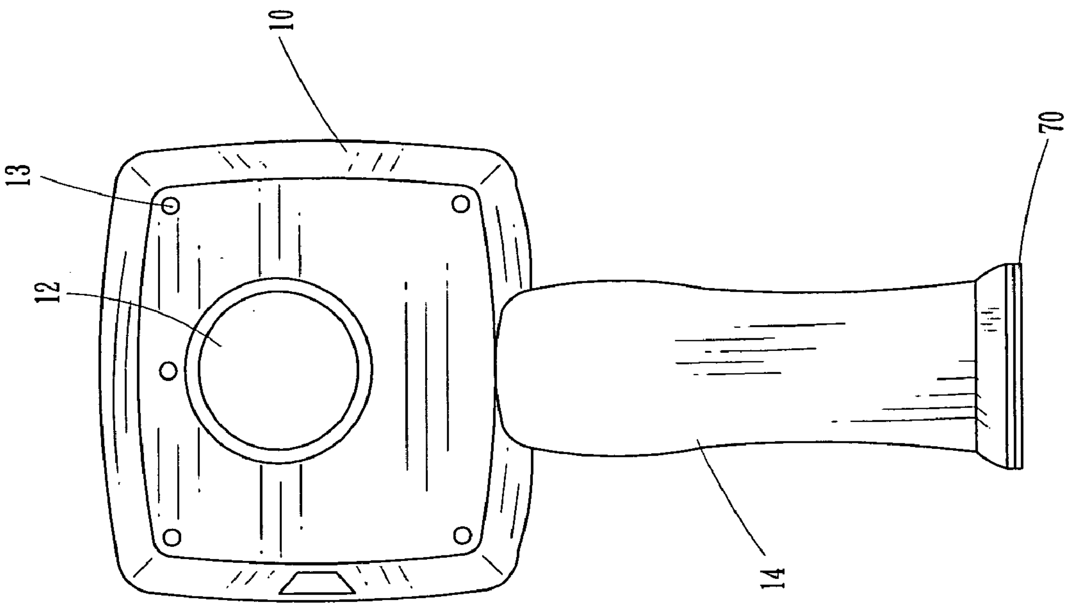
FIG. 4 is a rear side plan view of the pneumatic hand tool of the present invention.
Figure 5:
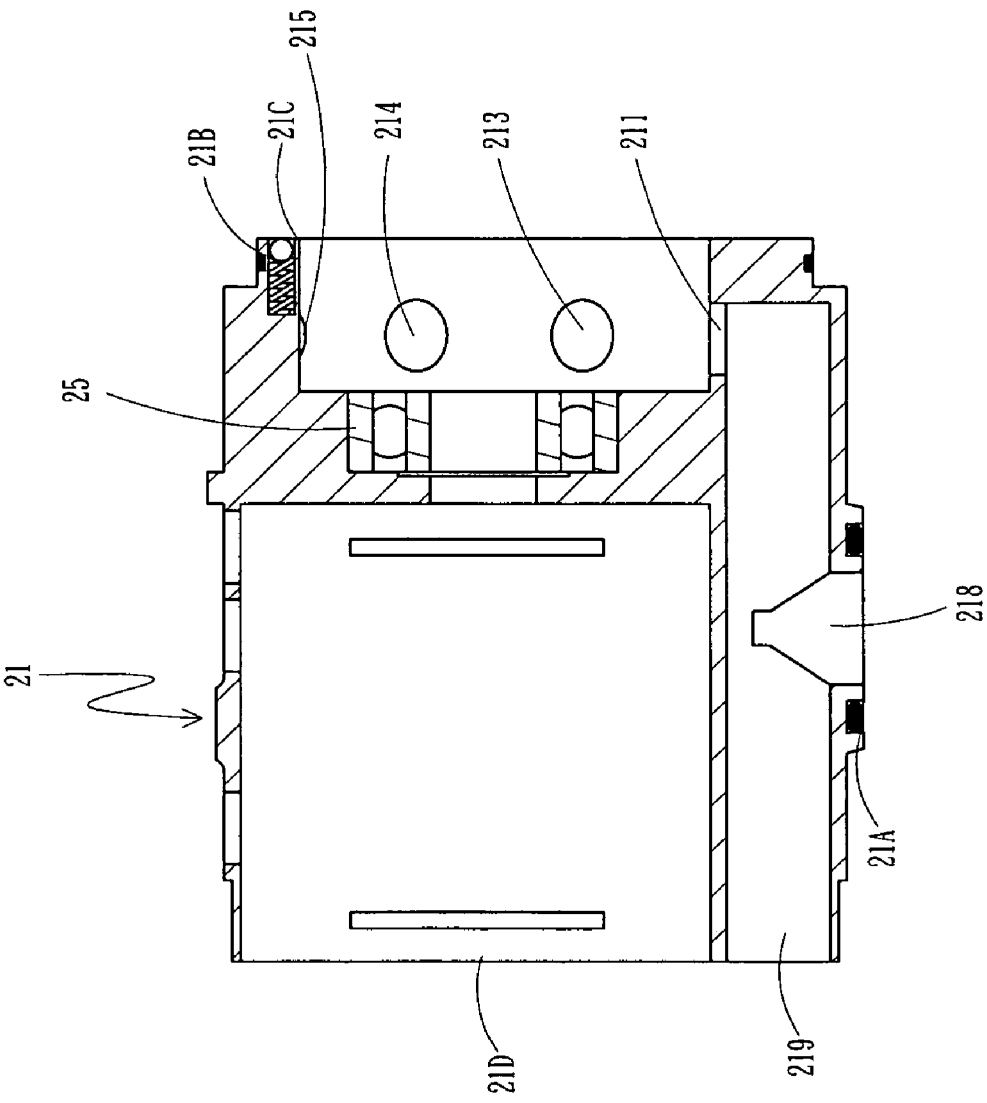
FIG. 5 is side plan view of the cylinder of the present invention.
Figure 6:
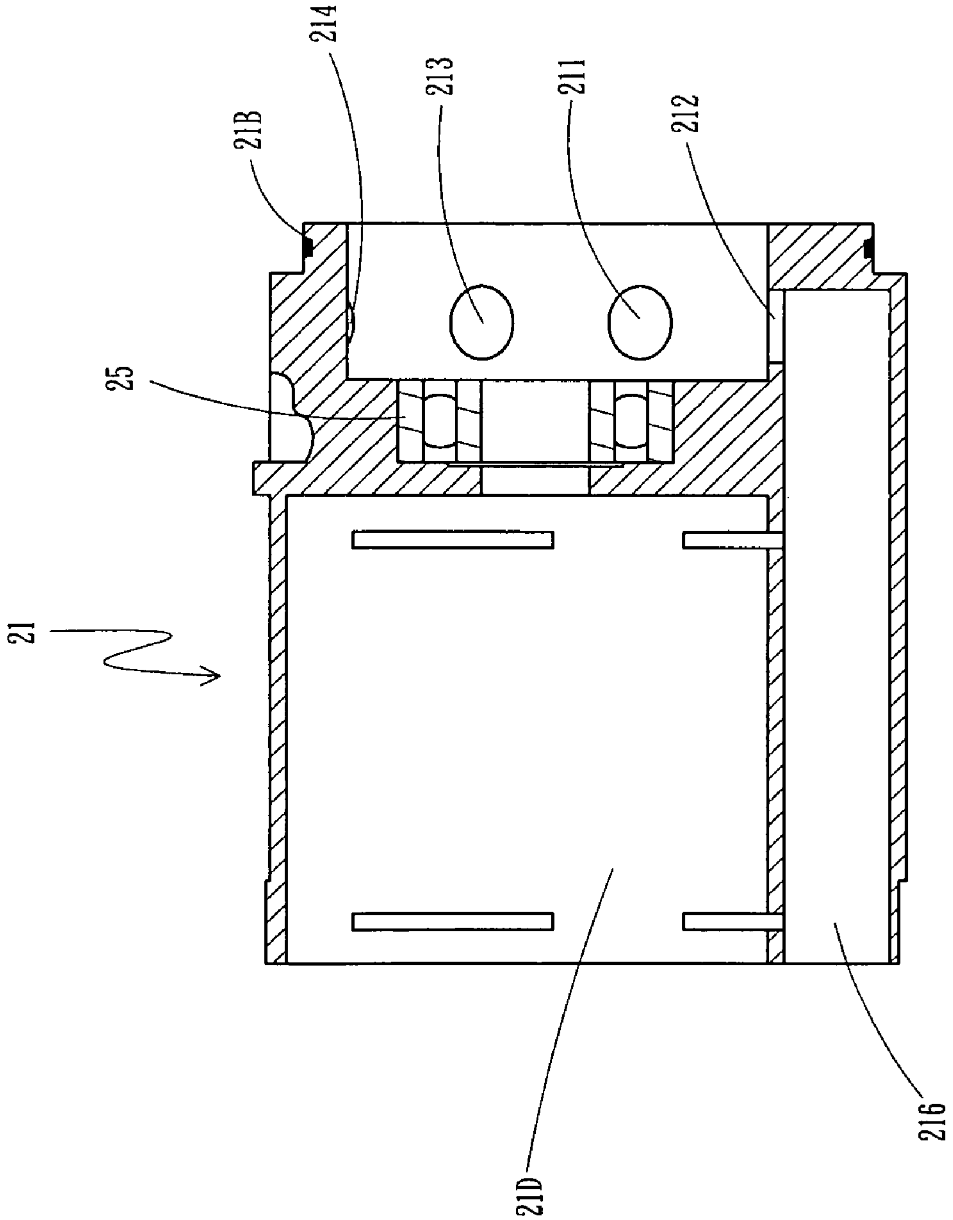
FIG. 6 is a side plan view of the cylinder in a different angle to that of FIG. 5.
Figure 7:
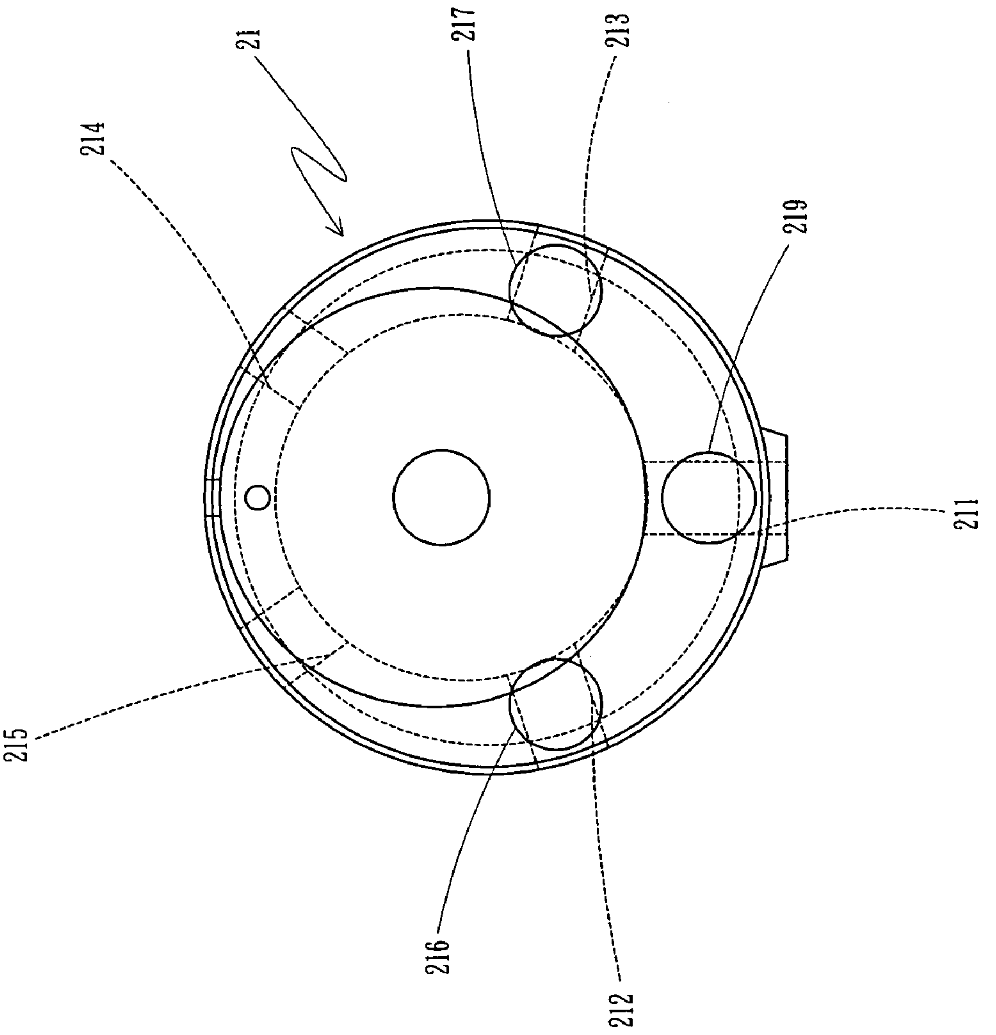
FIG. 7 is a schematic plan view of the cylinder of the present invention.
Figure 8:
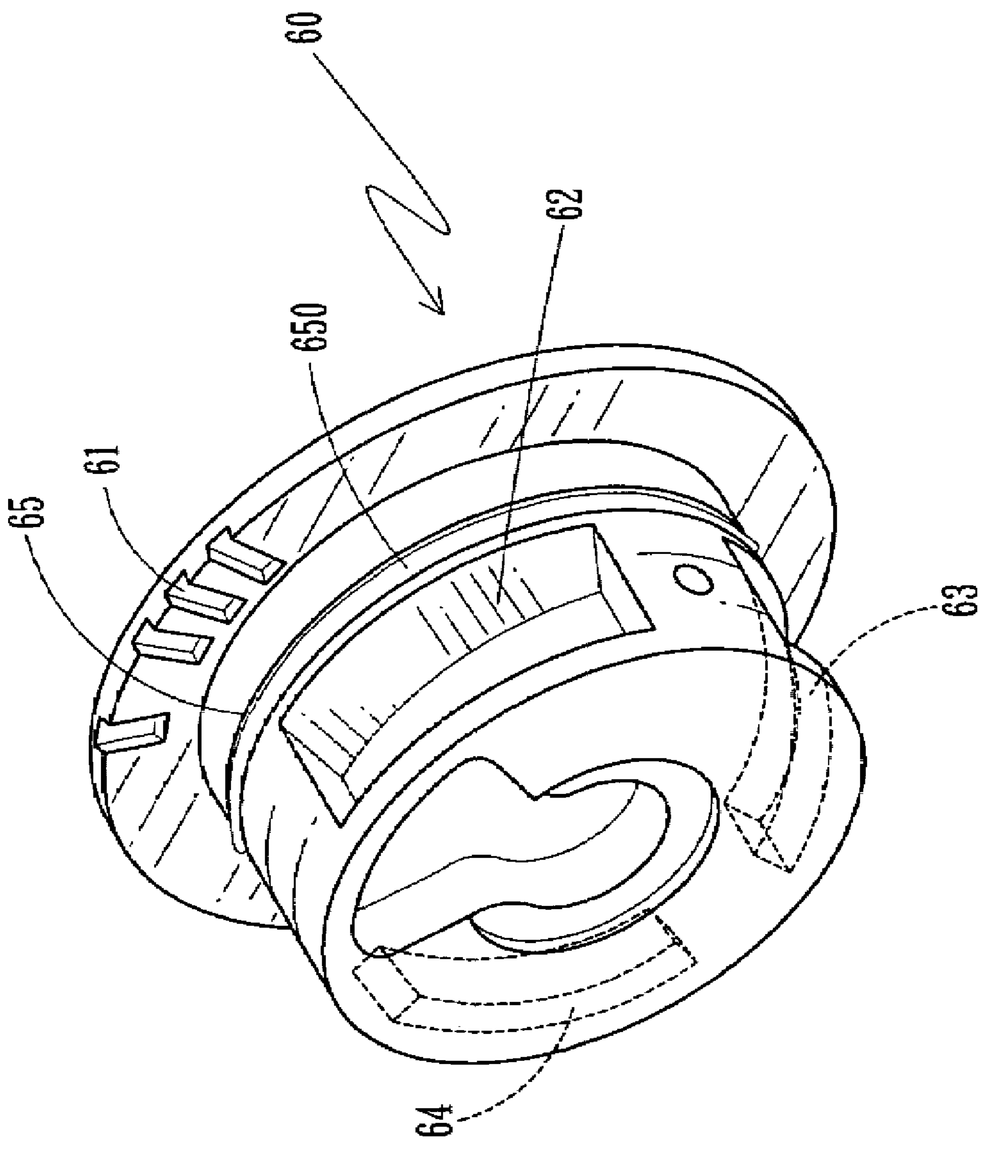
FIG. 8 is a perspective view of the control knob of the present invention.
Figure 9:
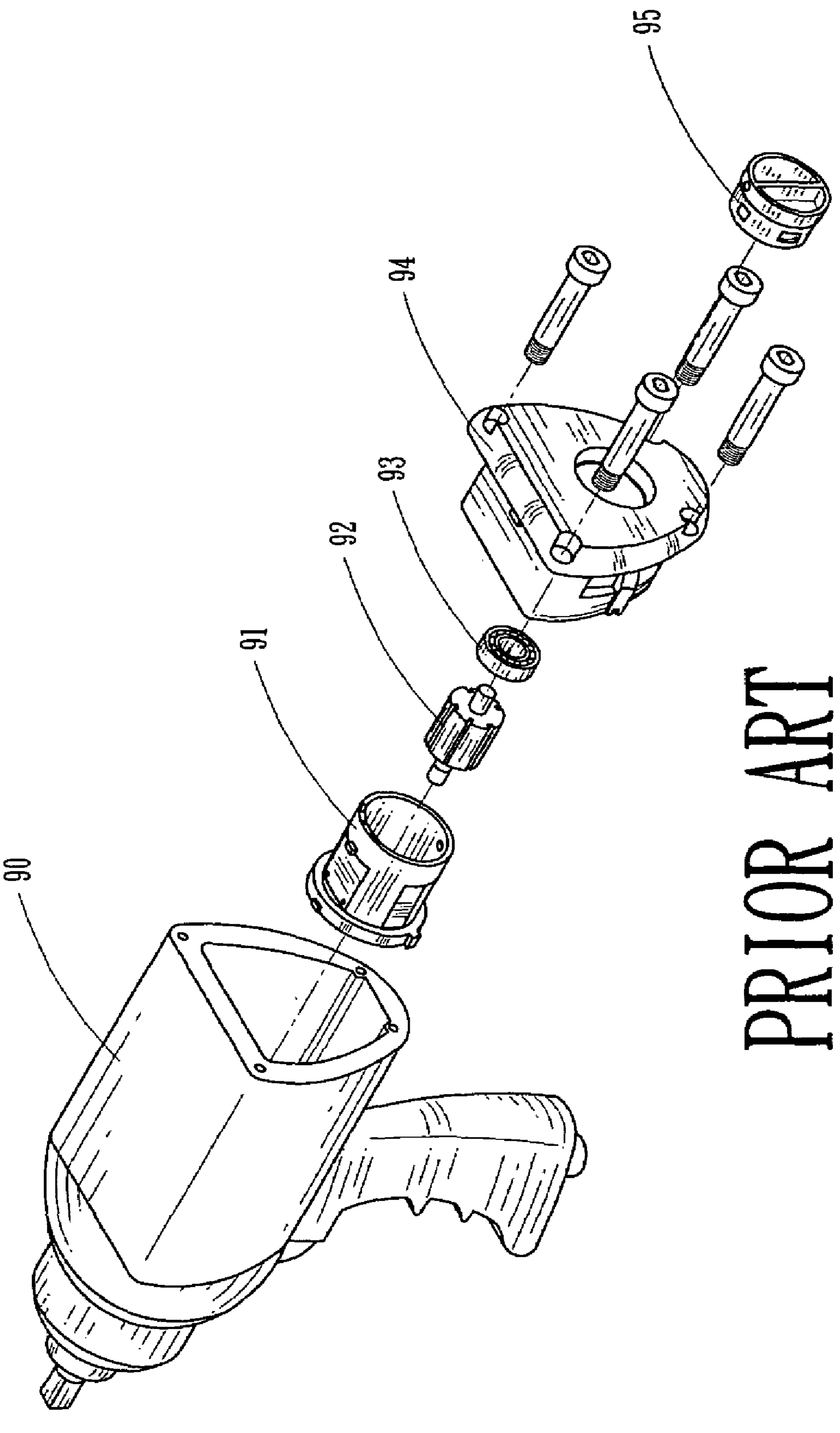
PRIOR ART FIG. 9
FIG. 9 is an exploded perspective view of a conventional pneumatic hand tool.

With reference to FIGS. 1 to 8, it is noted that the pneumatic hand tool in accordance with the present invention includes a hollow body (10), a cylinder assembly (20) received inside the body (10), a sealing pad (30), a striking assembly (40), a front cap (50) sealingly connected to the body (10) with the sealing pad (30) sandwiched therebetween, a control knob (60) rotatably mounted on a side face of the body (10), an exhaust cap (70) connected to a bottom face of a handle (14) of the body (10) and threaded bolts (80) extended through the body (10) to securely connect the front cap (50) to the body (10).

The body (10) has a front opening, a space (11) defined in a front portion thereof to communicate with the front opening, a closed rear end provided with a control knob mounting portion (12) and threaded bolt extending portion (13) and a handle (14) extending downward from a bottom face of the body (10) and having a connection portion (140) defined in a bottom face of the handle (14).

The cylinder assembly (20) is composed of a cylinder (21), a rotor (22), a front cover (23), a first bearing (24), a second bearing (25), a resilient control assembly (26) and a airtight seal (27). The cylinder (21) has a first leakproof portion (21A), a second leakproof portion (21B), a resilient control assembly receiving recess (21C) and a rotor receiving chamber (21D). The first leakproof portion (21A) and the second leakproof portion (21B) respectively have the airtight seal (27). The resilient control assembly receiving recess (21C) is defined to receive therein the resilient control assembly (26) and the rotor receiving chamber (21D) is defined to receive therein the rotor (22). The rotor (22) has a front shaft (220) provided with a first coupling portion (221), a rear shaft (222) extending from a rear side of the rotor (22), multiple slits (223) defined in an outer periphery thereof to respectively receive therein a blade (224). The rear shaft (222) extends through the cylinder (21) to have the second bearing (25) mounted therearound and the front shaft (220) extends through the front cover (23) to have the first bearing (24) mounted therearound with the front cover (23) mounted on the front portion of the cylinder (21). The cylinder (21), which is received in the space (11) of the body (10), has a rear inlet opening (211), a first inlet (212), a second inlet (213), a first exhaust opening (214), a second exhaust opening (215), a first inlet passage (216), a second inlet passage (217), a bottom inlet opening (218) and an air intake (219), wherein the first inlet (212) and the second inlet (213) respectively communicate with the first inlet passage (216) and the second inlet passage (217), the bottom inlet opening (218) communicates with the rear inlet opening (211) via the air intake (219).

The sealing pad (30) is mounted between the front cap (50) and the body (10) to secure the engagement between the front cap (50) and the body (10) in a airtight manner.

The striking assembly (40) has a central axle (41) extending from a first side thereof and a second coupling portion (42) extending a second side thereof opposite to the first side to couple with the first coupling portion (221) of the front shaft (220).

The front cap (50) has a through hole (51) defined in a front side thereof to allow extension of the central axle (41) therethrough and apertures (52) defined around a face thereof to allow extension of the threaded bolts (80) after extending through the threaded bolt extending portion (13) of the body (10) to secure the engagement between the front cap (50) and the body (10).

The control knob (60) is mounted at the control knob mounting portion (12) of the body (10) and has a stop recess (61) corresponding to the receiving recess (21C) of the cylinder (21) to sandwich the resilient control assembly (26) therebetween, an air inlet (62), a first air exhaust hole (63), a second air exhaust hole (64) and a leak prevention portion (65) with a leak seal (650) such that after the control knob (60) is mounted at the control knob mounting portion (12), the leak seal (650) is able to prevent any leakage between the control knob (60) and the body (10).

The exhaust cap (70) has a coupling portion (71) corresponding to and engaged with the connection portion (140) of the handle (14).

After extension of the threaded bolts (80) through the threaded bolt extension portion (13) of the body (10) and into the apertures (52) of the front cap (50), the engagement between the body (10) and the front cap (50) is completed.

With reference to FIGS. 2-8, which are exploded perspective view, sectional view and enlarged perspective views of the components of the present invention, it is noted that the rear end of the central axle (41) of the striking assembly (40) is mounted with the first bearing (24). The outer rim of the first bearing (24) is fitted into the front cover (23). The front shaft (220) of the rotor (22), after extending through the first bearing (24), is connected to the second coupling portion (42) of the striking portion (40) via the first coupling portion (221) thereof, such that rotation of the rotor (22) is able to drive the striking portion (40) to rotate simultaneously. The blades (224) are securely received in the slits (223) of the rotor (22). The front portion of the cylinder assembly (20) is securely connected to the front cover (23) to form a closed space to receive therein the rotor (22) as well as the blades (224). The rear shaft (222) of the rotor (22) is extended through the cylinder (21) to have the second bearing (25) mounted therearound. The control knob (60) is mounted at the rear portion of the cylinder (21) and the central axle (41) of the striking assembly (40) is extended through the through hole (51) of the front cap (50). With the existence of the sealing pad (30) between the boy (10) and the front cap (50), the striking assembly (40) and the cylinder assembly (20) are sealingly sealed between the front cap (50) and the body (10). Also, the connection portion (140) engages with the coupling portion (71) of the exhaust cap (70) to form a light weight and compact pneumatic hand tool.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pneumatic hand tool consisting essentially of:

a hollow body having a space in a front portion thereof, a control knob mounting portion and a threaded bolt extension portion both defined in a closed rear end of the body and a handle extending downward therefrom and provided with a connection portion at a bottom face of the handle;

a cylinder assembly composed of a cylinder, a rotor, a front cover, a first bearing, a second bearing, a airtight seal and a resilient control assembly, wherein the cylinder is provided with a first leakproof portion, a second leakproof portion, a rotor receiving recess to receive therein the rotor and a rotor receiving chamber, the rotor has a front shaft extending through the front cover to have the first bearing mounted therearound and provided with a first coupling portion formed on the front shaft, a rear shaft oppositely extending relative to the front shaft and through the rear side of the cylinder to have the second bearing mounted therearound, the font cover is securely connected to the cylinder so as to allow the cylinder assembly to be received in the space of the body;

a sealing pad mounted between the body and a front cap to allow the body to engage with the front cap in a airtight manner;

a striking assembly having a central axle extending from a first side thereof and a second coupling portion extending from a second side thereof opposite to the first side to couple with the first coupling portion of the front shaft;

a front cap having a through hole defined in a front portion thereof to allow extension of the central axle of the striking assembly and apertures defined around a side face of the front cap such that when the front cap is connected to the body, threaded bolts are able to extend through threaded bolt extension portion of the body and the apertures of the front cap to secure engagement between the body and the front cap;

a control knob mounted at the control knob mounting portion of the body and having a leak prevention portion with a leak seal to ensure that engagement between the control knob and the body is airtight; and an exhaust cap with a coupling portion corresponding to and engaged with the connection portion of the handle of the body so that the pneumatic hand tool is compact and lightweight.

2. The pneumatic hand tool as claimed in claim 1, wherein the cylinder has a rear inlet opening, a first inlet, a second inlet, a first exhaust opening, a second exhaust opening, a first inlet passage, a second inlet passage, a bottom inlet opening and an air intake, wherein the first inlet and the second inlet respectively communicate with the first inlet passage and the second inlet passage, the bottom inlet opening communicates with the rear inlet opening via the air intake.

3. The pneumatic hand tool as claimed in claim 1, wherein the control knob has a stop recess corresponding to the resilient control assembly receiving recess of the cylinder to sandwich the resilient control assembly therebetween, an air inlet, a first air exhaust hole, a second air exhaust hole and a leak prevention portion with a leak seal such that after the control knob is mounted at the control knob mounting portion, the leak seal is able to prevent any leakage between the control knob and the body.

* * * * *